(12) United States Patent
Hall, Jr. et al.

(10) Patent No.: US 8,020,840 B2
(45) Date of Patent: Sep. 20, 2011

(54) VERSATILE CLAMP

(75) Inventors: Herbert L. Hall, Jr., Newark, OH (US); Ronald J Hamilton, Mt. Vernon, OH (US)

(73) Assignee: Herbert L. Hall, Jr., Newark, OH (US)

( * ) Notice: Subject to any disclaimer, the term of this patent is extended or adjusted under 35 U.S.C. 154(b) by 78 days.

(21) Appl. No.: 11/903,250

(22) Filed: Sep. 20, 2007

(65) Prior Publication Data

US 2008/0086852 A1  Apr. 17, 2008

Related U.S. Application Data

(63) Continuation-in-part of application No. 10/804,652, filed on Mar. 19, 2004, now abandoned.

(60) Provisional application No. 60/456,170, filed on Mar. 20, 2003.

(51) Int. Cl.
*B25B 1/24* (2006.01)

(52) U.S. Cl. ...................... 269/6; 269/3; 269/45; 81/421

(58) Field of Classification Search .................. 269/3, 6, 269/45, 166, 266, 261, 259; 81/421, 423
See application file for complete search history.

(56) References Cited

U.S. PATENT DOCUMENTS

| 4,350,381 | A | * | 9/1982 | Hellmann | 294/88 |
|---|---|---|---|---|---|
| 4,779,857 | A | * | 10/1988 | Maund | 269/71 |
| 5,009,134 | A | * | 4/1991 | Sorensen et al. | 81/487 |
| 6,530,565 | B1 | * | 3/2003 | Simpson | 269/6 |
| 7,415,912 | B2 | * | 8/2008 | Tyler | 81/367 |
| 7,618,029 | B2 | * | 11/2009 | Haley | 269/8 |
| 2008/0086852 | A1 | * | 4/2008 | Hall et al. | 24/528 |

* cited by examiner

*Primary Examiner* — Lee D Wilson

(57) ABSTRACT

A versatile clamp which consists, at least in part, of at least one extendable arm, one fixed-length arm, pivotable clamping legs on the distal ends of the fixed-length arm and extendable arm, and locking means; wherein clamp adjustments, by the user, to the extendable arm and pivotable legs are retained by a locking action, which, prevents an inadvertent change of the extendable arm's effective length and the clamping legs' angular orientation from their set positions. The combination of a variable-length extendable arm and variable angular positioning of the legs enable a single versatile clamp to be used in a variety of clamping configurations. The versatile clamp may be easily made, without the use of any tools, to clamp onto thick and thin materials, alike, and to perform in applications which require an offset clamping operation. The versatile clamp may also feature one or more interchangeable clamping arm extensions and legs.

27 Claims, 1 Drawing Sheet

VERSATILE CLAMP

BRIEF DESCRIPTION OF THE DRAWING

Related Applications

This application is a Continuation In Part of application Ser. No. 10/804,652, filed on Mar. 19, 2004 now abandoned entitled VARIABLE LENGTH CLAMPING ARMS AND OTHER INTEGRAL MEANS WHEREBY CLAMPS MAY BE ADAPTED TO A MULTITUDE OF CLAMPING APPLICATIONS; which, claims priority from U.S. Provisional Patent Application Ser. No. 60/456,170, filed Mar. 20, 2003 of the same title

TECHNICAL FIELD

Figure 1:
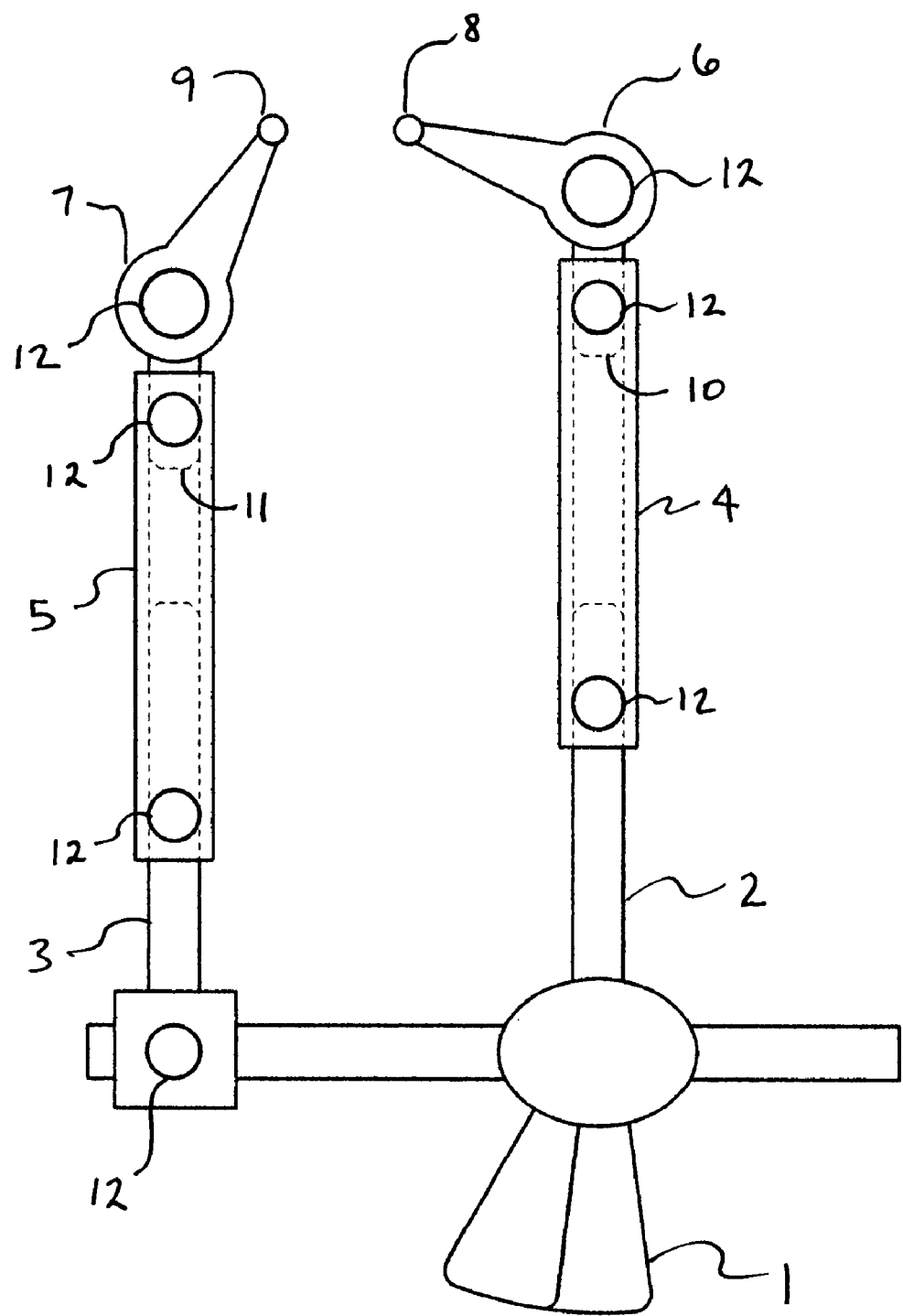

The present invention relates to clamping devices. More particularly, it relates to improvements to clamping devices known as: vise-grip clamps, welding clamps, quick clamps, bar clamps, and locking-toggle clamps. These clamps are commonly used in holding applications where two or more work pieces are held together in preparation for a welding or gluing operation, or, to simply hold fast one or more parts in a desired spatial position relative to the clamp, or optionally, to a support member.

BACKGROUND OF THE INVENTION

Because of the many possible applications in terms of clamping requirements, there are nearly as many types of clamps to meet these diverse needs. Some clamping applications require clamps with long clamping arms. Other applications require clamps with offset clamping leg terminations. Certain applications require specialized clamp terminations, in order to adapt the clamp to a particular work piece. As a result, certain trades require workers to have on hand a large collection of different sizes and styles of clamps. The expense of acquiring and maintaining a large set of clamps can be considerable. Besides the cost, having numerous clamps on hand can occupy a lot of storage space.

A further drawback to currently available clamps is that the clamp's terminations do not always line up properly. This is often a result of over-tightening the clamp onto a work piece. Sprung clamps are usually discarded. Sometimes, with great difficulty, an attempt is made to realign the terminations; often, with unsatisfactory results. If a damaged clamp is not discarded, or if the repair is unsuccessful, continued use of the clamp can create a dangerous condition Misaligned terminations can cause a clamp to unexpectedly lose its hold on the one or more work pieces and injure the worker or damage some part.

One prior art clamp, which is not commercially available, discloses two means whereby locking toggle clamps may be adapted to a variety of clamping applications. In a first embodiment, clamp arm extensions are added, in an end-to-end fashion, to supposedly increase the reach of the clamping arms. This approach is impractical because the termination clamping member can only be sized to fit a similarly sized extension member. The extension members are depicted as being parallelepiped in shape, with each successive extension fitting inside the hollow end portion of its adjacent member (proximal to the handle end). Consequently, a clamp configured for a short reach (short effective arm length), would require fewer extension members; which, would, necessarily, involve extensions with larger end openings. The termination clamping members would, therefore, not properly fit any of the larger openings of the proximal extension members which are closer to the handle end of the clamp; thereby, obviating this method as a means of lengthening or shortening the effective clamp arm length, or reach of the clamp.

Even if allowances were made in the design of the prior art clamp whereby the ends of each extension was configured according to a bell and spigot arrangement, in which one end of each extension was identically sized according to a bell, and the opposing end of each extension was identically sized according to a spigot, the resulting clamping system would be cumbersome. The reach of the clamp would be increased by relatively large increments. Also, for a plurality of extensions in which there are more than two bell and spigot connections from the clamp arm to the clamping termination member, there would be an undesirable amount of slop, looseness, and an imprecise meeting of the clamp termination members due to an accumulation of clearances for each connection.

The second embodiment of the prior art clamp, according to one of its claims, entails a "... plurality of tubular extension members, each slidably mounted within the next adjacent extension member between extended and retracted positions for adjustably changing the effective length of said jaw members ... ". However, this claim is not supported by any of the included drawings. The drawing only depicts a hollow end portion in one end of each extension member. Therefore, the actual range of the clamp's reach between an extended position and the retracted position is indeterminate. Problems are presented whether or not each extension member is fully, or only partially, enclosed along its length within its adjacent proximal extension member. While a fully enclosed extension affords a more compact retracted configuration, problems would arise as to being able to extract extensions stuck, one inside another in the event one of the members were to become even only slightly bent. If some length were left exposed, as in a partially enclosed construction, the plurality of extension members would not result in a compact arrangement, even when in a retracted position. Additionally, any clamp system which has a plurality of extension members, and a gripping termination member, would introduce excessive slop when the clamp is in an extended position; as has been previously described. Further, a clamp configured to have a plurality of extensions would be heavy, bulky to use, and costly to manufacture.

Another problem with the prior art invention relates to the manner in which the first extension members are secured in the ends of the arms (jaws). A double-headed pin is used in each arm to retain the first extension members thereto. Throughout the specification, pins are described as being used in a non-removable manner. Also, the arms (jaws) are shown to have deep recesses which could never be accessed by reason of the pinned connections.

Prior art inventions, including U.S. Pat. No.: 2,474,940 to Hansen, and U.S. Pat. No.: 3,403,901 to Servadio, and U.S. Pat. No.: 5,143,359 to Bush, are representative of numerous patents which relate to mountable adapters on clamps and pliers. These devices are directed to the terminations of the clamping members in order to adapt the clamp or pliers to a variety of work piece shapes. These termination adapters are removable and interchangeable with other termination adapters and in no way reflect a desire by their inventors to accommodate a nearly infinite variety of clamping applications, particularly, offset conditions which are often encountered in clamping applications. Many times, the one or more work pieces to be gripped, or clamped, are not centered with respect to the distance between the clamp's arms. As a result, if a clamp with the requisite offset is unavailable, one or more spacers are often used to provide the necessary offset. The use of spacers is not recommended and can be hazardous to the user and others. Spacers can easily slide out of place, causing the clamp to quickly, and unexpectedly, lose its grip on the work piece; which, can cause possible physical harm to those who happen to be nearby, or damage to the clamped or other parts.

Prior art inventions do not teach, nor do they contemplate the need, or the advantages, for a means to be able to adjustably secure clamp arm extensions in a desired reach configuration as might be expected of an extendable table leg, tripod leg, or pruning pole. Prior art inventions also do not teach, or anticipate the advantages of utilizing a replaceable, or interchangeable, clamp arm extension member wherein only one extension member is in use at a time on each arm, and wherein a macro arm length adjustment is made by using a singular extension member of a longer or shorter length, and a smaller arm length adjustment is made by means of indexing the position of the one arm extension on each of the clamp's arms, or an infinitely variable adjustment of the one arm extension on each of the clamp's arms. Further, prior art inventions do not teach, nor anticipate, the advantages of incorporating at least a lockable fine adjustment range in the overall reach of a clamp for the purpose of precisely aligning the clamping legs' termination members. Still further, prior art inventions do not teach, nor contemplate, the advantages of a single, interchangeable, clamping leg member which, itself, engages at least one of the clamp's arms, without the use of an arm extension, and is adjustable in regard to varying the effective reach of a clamp.

Therefore, it is the several objects of the present invention to devise an integral clamping system whereby:
1. A simple, compact, economical, and practical clamp system which has an adjustable reach, offset, and work piece thickness capability with the least number of integrally designed interchangeable parts.
2. The clamp's reach can be adjusted in large or small increments and prevented from further inadvertent movement.
3. The overall range of the clamp's reach is variable between a maximum extended position and a minimum retracted position.
4. The clamp's reach is changed manually, without the use of any other tools.
5. The clamp's termination offset distance is infinitely variable and can be set manually without the use of any other tools.
6. The clamp is able to reliably and safely clamp onto a wide range of work piece thicknesses and can be set manually without the use of any other tools.

SUMMARY OF THE INVENTION

The present invention in a preferred embodiment consists of a clamp, the assembly of which includes a handle-actuation part which is grasped and manipulated by a user to cause a clamping action; two clamping arms operatively connected to the handle-actuation part; two interchangeable clamping arm extensions, wherein one extension is mounted outside of and in a sliding relationship on the first clamping arm, and, a second extension is similarly mounted in a sliding relationship on the second clamping arm; fixing means, preferably by means of low profile thumbwheel fasteners, whereby the relative position of the extensions on the respective clamp arms may be independently set and fixed by the user without the use of any other tools; and, two pivotable clamping leg assemblies which are removably mounted to the ends of the extensions, and, thumbwheel fastener means whereby the pivoting clamping legs may be set at any desired angular orientation required by the clamping application.

The handle part of the present invention may be configured according to either a locking toggle clamp, or a bar clamp. Locking toggle clamps, when manipulated by the user, cause at least one of the clamping members to move in an arc motion, whereas, bar clamps cause at least one of it's clamping members to move in a rectilinear motion. The manner of movement of the operative clamp arm does not matter to the operation of the present invention. Therefore, the present invention may be configured according to either clamp style, or other clamp styles which are able to move clamping arms into a clamping relationship with respect to each other.

The clamp arms are members which extend away from the handle. In the preferred embodiment they consist of plain bars, rectangular-shaped in cross section. The clamping arm bars are attached to the handle in the same manner as they would be in conventional practice. However, they depart from the prior art in that one slidable arm extension is mounted on each arm. The use of only one extension per arm overcomes many drawbacks of using multiple arm extensions.

A desired increase in the reach of the clamp beyond the extended positioning of the installed extensions is accomplished by removing the two pivotable clamping leg assemblies from the ends of the extensions. The extensions are loosened and removed from the clamp arms. A matched pair of longer extensions is then selected from a family of extensions, where, each pair of extensions consists of a different length from the other pairs of extensions. Next, the selected pair of extensions are then slid onto the arms and temporarily fixed in place. And finally, the pivotable clamping leg assemblies are mounted into the receiver ends of the extensions by inserting the pivotable stem ends into the receivers and tightening their fasteners in order to hold them in place.

In order to complete the adaptation of the clamp to a particular application, the user would decide the exact amount of clamp termination offset and reach which is required. One arm extension and its respective pivoting clamping leg assembly would be set accordingly and fixed in place with the integral fastener means provided with the clamp.

And finally, the second arm extension length and pivoting clamping leg would both be adjusted and set in order to simultaneously satisfy the reach and offset requirements by ensuring that the clamping terminations precisely meet.

The present invention, with a minimum number of duplicate clamp parts, is able to satisfactorily and safely perform more clamping applications than any other known type of clamp. Unlike welding clamps, which are primarily configured to clamp thin metal sheets or plates, the present invention, by rotating the pivoting clamping legs so that they are nearly parallel to the clamping arms, is also able to clamp onto thick work pieces without the clamp arms being excessively separated. This is particularly advantageous for toggle clamps which are somewhat limited in this regard due to the swing action of the operative clamping arm.

While the preferred embodiment has been described in general terms, it is to be understood that other embodiments, features, advantages, and variations have been found to be useful, as well. For example, clamping arms and their extensions may be uniformly curved. The extension cross section may be C-shaped and partially enclose the clamping arm over its engagement area, or, the extension may be tubular and fully enclose the clamping arm over its engagement area. While the extension has been described to surround the clamping arm on its one end, and the pivoting clamping leg on its other end, the clamping arm and pivoting clamping leg may, instead, completely surround, or partially surround, the clamping arm extension.

Advantageously, the present invention, with a bar clamp style of actuation means can also be quickly converted from a clamp to a spreader with a similar variable offset capability.

For some applications, a simplified second embodiment of the present invention consists of unitary arm extensions with clamping legs permanently attached. In other instances, unitary arm extensions may be provided with permanently attached blanks for the clamping leg portions. These blanks may be easily custom-machined in a milling machine for a unique application. Or, specialized terminations may be welded to the clamping leg blanks in order to satisfy a particular need.

As can be seen, there are many possible variations and combinations by which the present invention may be practiced that fall within the scope and intent of the invention.

FIG. 1 is a view of the present invention.

DETAILED DESCRIPTION OF THE INVENTION

FIG. 1 depicts a preferred embodiment of the present invention. The clamp consists of a handle 1 by which the clamp is manually actuated. When the handle 1 is operated, the clamping arms 2, 3 are made to move toward one another in a clamping relationship. Clamping arm extensions 4, 5 are slidable on arms 2, 3. Pivotable clamping legs 6, 7 are mounted into the ends of tubular extensions 4, 5 by means of stems 10, 11. Thumbwheels 12 are used to fix the positioning of the various members of the clamp in a desired orientation prior to clamping the one or more work pieces between the clamping leg terminations 8, 9.

The pivoting clamping legs 6, 7 have an infinitely variable angular adjustment capability. This is achieved by a split design, which, when tightened together by their respective thumbscrews, causes the two parts to be brought together in a rigid and fixed relationship.

As can be seen in the depiction, the clamp is configured to perform an offset clamping operation. By rotating the pivoting clamping legs and adjusting the arm extension length, one can adapt the present invention to wide variety of clamping applications.

What is claimed is:

1. A manually operated clamp comprised of
   a hand-grip assembly for actuating the clamp,
   first and second clamping arms, each of which has a proximal end and a distal end: wherein the proximal end of the clamping arms are attached to and actuated by the hand-grip assembly,
   first and second clamping arm extensions, each of which has a proximal end and a distal end: wherein the proximal end of the clamping arm extensions are slidably mounted on the distal end of respective first and second clamping arms,
   two pivotable clamping legs: wherein each clamping leg is attached to the distal end of respective first and second clamping arm extensions, and
   means whereby the clamping arm extensions and pivotable clamping legs are fixed in a desired combination of rectilinear and angular displacements, respectively, prior to performing a clamping operation.

2. The clamp of claim 1 in which the clamp is structured to clamp a workpiece by pinching together the workpiece.

3. The clamp of claim 1 in which the clamp is structured to clamp the workpiece by spreading apart the workpiece.

4. The clamp of claim 1 wherein the hand-grip assembly is structured according to a locking toggle clamp.

5. The clamp of claim 1 wherein the hand-grip assembly is structured according to a type of bar clamp whereby the actuation of at least one clamping arm enables the clamping of a workpiece.

6. A manually operated clamp comprised of:
   a hand-grip assembly for actuating the clamp,
   first and second clamping arms, each of which has a proximal end and a distal end: wherein the proximal end of the clamping arms are attached to and actuated by the hand-grip assembly,
   first and second clamping arm extensions, each of which has a proximal end and a distal end: wherein the proximal end of the clamping arm extensions are slidably mounted on the distal end of respective first and second clamping arms and interchangeable with other clamping arm extensions,
   two pivotable clamping legs: wherein each clamping leg is interchangeably mounted to the distal end of of respective first and second interchangeable clamping arm extensions, and
   means whereby the clamping arm extensions and pivotable clamping legs are fixed in a desired combination of rectilinear and angular displacements, respectively, prior to performing a clamping operation.

7. The clamp of claim 6 wherein the hand-grip assembly is structured according to a locking toggle clamp.

8. The clamp of claim 6 wherein the hand-grip assembly is structured according to a type of bar clamp whereby the actuation of at least one clamping arm enables the clamping of a workpiece.

9. A manually operated clamp comprised of:
   a hand-grip assembly for actuating the clamp,
   a first clamping arm which has a proximal end and a distal end: wherein the proximal end of the first clamping arm is attached to and actuated by the hand-grip assembly; and, wherein the distal end of the first clamping arm consists of a pivotable clamping leg,
   a second clamping arm which has a proximal end and a distal end: wherein the proximal end of the second clamping arm is attached to and actuated by the hand-grip assembly,
   a clamping arm extension which has a proximal end and a distal end: wherein the proximal end of the clamping arm extension is slidable mounted on the distal end of the second clamping arm; and, wherein the distal end of the clamping arm extension consists of a pivotable clamping leg, and
   a means whereby the one clamping arm extension and the pivotable clamping legs are fixed in a desired combination of rectilinear and angular displacements, respectively, prior to performing a clamping operation.

10. The clamp of claim 9 wherein the hand-grip assembly is structured according to a locking toggle clamp.

11. The clamp of claim 9 wherein the hand-grip assembly is structured according to a type of bar clamp whereby the actuation of at least one clamping arm enables the clamping of a workpiece.

12. The clamp of claim 1 comprised of clamping arm extensions which are substantially hollow on their proximal ends: wherein the clamping arms are slidably mounted inside of the clamping arm extensions.

13. The clamp of claim 1 comprised of clamping arms which are substantially hollow on their distal ends: wherein the clamping arm extensions are slidably mounted inside of the clamping arms, 14. The clamp of claim 6 comprised of clamping arm extensions which are substantially hollow on their proximal end and their distal end: wherein the clamping arms and the clamping legs are slidably mounted inside of the clamping arm extensions.

15. The clamp of claim 6 comprised of clamping arms which are substantially hollow on their distal ends: wherein the clamping arm extensions are slidably mounted inside of the clamping arms, and clamping legs in which their mounting ends are substantially hollow: wherein the clamping legs are slidably mounted on the outside of the clamping arm extensions.

16. A manually operated clamp comprised of
    a hand-grip assembly for actuating the clamp, first and second clamping arms, each of which has a proximal end and a distal end: wherein the proximal end of the clamping arms are attached to and actuated by the hand-grip assembly,
    first and second clamping arm extensions, interchangeable with other clamping arm extensions, each of which has a proximal end and a distal end: wherein the proximal end of the clamping arm extensions are slidably mounted on the distal end of respective first and second clamping arms, and
    a distal end of the first and second clamping arm extensions which consists of clamping legs, and
    means whereby the clamping arm extensions are fixed in a desired rectilinear displacement prior to performing a clamping operation.

17. The clamp of claim 16 wherein the hand-grip assembly is structured according to a locking toggle clamp.

18. The clamp of claim 17 wherein the distal end of at least one clamping arm extension consists of a variable length clamping leg.

19. The clamp of claim 16 wherein the hand-grip assembly is structured according to a type of bar clamp whereby the actuation of at least one clamping arm enables the clamping of a workpiece.

20. The clamp of claim 16 comprised of clamping arm extensions which are substantially hollow on their proximal ends: wherein the clamping arms are slidably mounted to the inside of the clamping arm extensions.

21. The clamp of claim 16 comprised of clamping arms which are substantially hollow on their distal ends: wherein the clamping arm extensions are slidably mounted to the inside of the clamping arms.

22. The clamp of claim 16 comprised of clamping arms and clamping arm extensions which are uniformly curved and slidable on one another: wherein the clamping arm extension, when adjusted, moves in an arc, and
    means whereby the clamping arm extensions are fixed in a desired curvilinear displacement prior to performing a clamping operation.

23. A manually operated clamp comprised of
    a hand-grip assembly for actuating the clamp,
    first and second clamping arms, each of which has a proximal end and a distal end: wherein the proximal end of the clamping arms are attached to and actuated by the hand-grip assembly, and wherein the distal end of the clamping arms consist of pivotable clamping legs, and
    a means whereby the pivotable clamping legs are fixed in a desired angular displacement prior to performing a clamping operation.

24. A manually operated clamp comprised of
    a hand-grip assembly for actuating the clamp,
    first and second clamping arms, each of which has a proximal end and a distal end: wherein the proximal end of the clamping arms are attached to and actuated by the hand-grip assembly, and wherein the distal end of the clamping arms are adapted for the removable attachment of pivotable clamping legs, which are interchangeable with other clamping legs, and
    a means whereby the clamping legs are fixed in a desired angular displacement prior to performing a clamping operation.

25. A manually operated clamp comprised of
    an assembly for actuating the clamp,
    first and second clamping arms, each of which has a proximal end and a distal end: wherein the proximal end of the clamping arms are attached to and actuated by the clamp actuation assembly,
    first and second clamping arm extensions, each of which has a proximal end and a distal end: wherein the proximal end of the clamping arm extensions are slidably mounted on the distal end of respective first and second clamping arms and interchangeable with other clamping arm extensions,
    two pivotable clamping legs: wherein each clamping leg is interchangeably mounted to the distal end of respective first and second interchangeable clamping arm extensions, and
    means whereby the clamping arm extensions and pivotable clamping legs are fixed in a desired combination of rectilinear and angular displacements, respectively, prior to performing a clamping operation.

26. The clamp of claim 24 wherein the clamp actuation assembly is structured according to a type of bar clamp whereby the clamping arms are brought together to clamp a workpiece.

27. The clamp of claim 24 wherein the clamp actuation assembly is structured according to a type of bar clamp whereby the clamping arms are spread apart to clamp a workpiece.

* * * * *